United States Patent [19]

Alferness

[11] 4,381,139
[45] Apr. 26, 1983

[54] VELOCITY MISMATCHED MODULATOR
[75] Inventor: Rodney C. Alferness, Holmdel, N.J.
[73] Assignee: Bell Telephone Laboratories, Incorporated, Murray Hill, N.J.
[21] Appl. No.: 182,432
[22] Filed: Aug. 29, 1980
[51] Int. Cl.³ .............................................. G02B 5/14
[52] U.S. Cl. ............................. 350/96.14; 350/96.13
[58] Field of Search ......................... 350/96.11–96.15
[56] References Cited
U.S. PATENT DOCUMENTS
3,995,311 11/1976 Taylor .............................. 350/96.14
4,236,785 12/1980 Papuchon et al. ............... 350/96.14

Primary Examiner—David K. Moore
Attorney, Agent, or Firm—S. Sherman

[57] ABSTRACT

The coupling efficiency between a pair of identical optical waveguides (11, 12) is modulated by a traveling electrical wave (14, 15). Because the propagating constants of the optical and modulating systems are not equal, the interaction between them is limited to periodic intervals along the optical wavepaths. By the appropriate selection of this spatial period, a velocity match between the modulating and optical systems is simulated.

9 Claims, 3 Drawing Figures

VELOCITY MISMATCHED MODULATOR

TECHNICAL FIELD

This application relates to traveling wave modulators.

BACKGROUND OF THE INVENTION

In U.S. Pat. No. 4,251,130 and in the copending application and by P.P. Liu et al, Ser. No. 161,761, filed June 23, 1980, assigned to applicant's assignee, coupled circuits of the velocity-matched type (VMG) are disclosed. In the Marcatili application, coupling efficiency is controlled by a traveling electrical wave that propagates in synchronism with an optical signal. In the Liu et al application, the electrical circuit is tuned so as to produce a standing electrical wave. However, the two oppositely propagating waves that produce the standing wave are also velocity matched to the optical signal. Because these devices are capable of generating very narrow optical pulses, they have been characterized as "gates." More specifically, the Marcatili device is referred to as a "traveling-wave, velocity-matched gate" (TW-VMG) while the Liu et al device is called a "standing-wave, velocity-matched gate" (SW-VMG).

The general problem with both classes of device resides in the fact that the refractive indices of the substrate material in which the circuit is formed may be very different at the electrical signal and optical signal frequencies. In such cases, the electrical wavepath must be specially designed to satisfy the velocity match requirement and, to the extent that the velocities of the two signals are not matched, the coupling efficiency degenerates significantly.

An alternative approach to this problem is to simulate a velocity match while, in fact, the two signals propagate at very different velocities. One arrangement for accomplishing this, as disclosed in a second copending application by E. A. J. Marcatili, Ser. No. 174,831, filed Aug. 4, 1980, and assigned to applicant's assignee, is to form a standing wave pattern along the electrical signal wavepath and then to shape the wavepath so that interaction between the standing electrical wave and the propagating optical wave occurs only along selected regions of the electrical signal wavepath. The net effect is to produce a standing-wave, velocity-mismatched gate (SW-VMMG) whose mode of operation is equivalent to that of a standing-wave, velocity-matched gate.

The TW-VMG is broadband in both the electrical and optical circuits. As such, it can be used as a broadband modulator, as described in U.S. Pat. No. 4,005,927, or it can be employed to generate ultranarrow optical pulses, as taught by Marcatili.

The SW-VMG and the SW-VMMG while being broadband in the optical circuit are narrowband in the electrical circuit. Because both employ standing waves, the electrical circuits are tuned circuits. In addition, the VMMG electrode configuration is designed for a specific wavelength electrical signal. Thus, the SW-VMG and the SW-VMMG are particularly suitable for generating narrow optical pulses by means of a single frequency electrical signal.

While the traveling-wave, velocity-matched configuration can be used as a broadband modulator, it requires, as noted above, that the electrical circuit be modified so as to achieve the necessary match. Using a lithium niobate substrate, the effective refractive index at optical frequencies is approximately 2.2 whereas it is approximately 6 at microwave frequencies. Thus, some means must be provided for lowering the effective index at microwave frequencies. One technique is to load the electrical circuit with a low index dielectric. However, the effect is to concentrate the electrical field in the lower index material rather than in the LiNiO$_3$, where it is required. As a result, such circuits are wasteful of microwave power. What is desired in a broadband modulator is both a broadband electrical circuit combined with efficient use of the electrical power.

SUMMARY OF THE INVENTION

In a modulator in accordance with the present invention, a velocity match for a pair of very dissimilar traveling wave circuits is simulated by limiting the coupling interaction between said circuits to longitudinally spaced intervals therealong, where the spatial period $\Lambda$ of said intervals is related to the wavelengths $\lambda_1$, $\lambda_2$ of the traveling waves and the effective refractive indices $n_1$, $n_2$ seen by said waves by $$\frac{1}{\Lambda} = \left| \frac{\lambda_1}{n_1} - \frac{\lambda_2}{n_2} \right|. \tag{1}$$

In an illustrative embodiment of the invention, one traveling wave supporting circuit comprises a pair of coupled optical waveguides, and the second traveling wave supporting circuit comprises a pair of finger electrodes superimposed upon the optical waveguides. By limiting the interaction between the two systems to the regions defined by the pairs of adjacent fingers, and by spacing the fingers in the manner indicated hereinabove, a velocity match for the propagating optical and electrical waves is simulated.

While designed primarily as a broadband modulator, the device can also be used as a traveling-wave, velocity-mismatched gate (TW-VMMG). However, because of the periodic coupling, the optical circuit is seemingly band-limited. However, the optical bandwidth can be readily increased by varying the electrode spacing.

DETAILED DESCRIPTION

Figure 1:
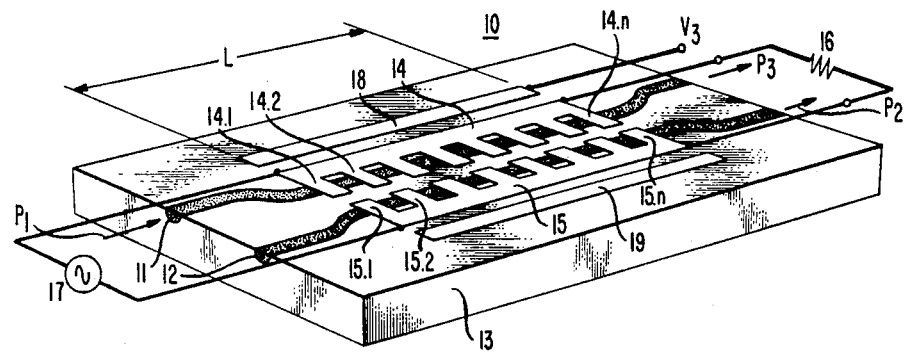
FIG. 1 shows a first embodiment of a modulator in accordance with the present invention.

The operation of both the velocity-matched and the velocity-mismatched gates are based upon controlling the transfer of energy between a pair of coupled wavepaths. For purposes of explanation and illustration, reference herein will be made to electrical and optical signals and wavepaths. However, it should be understood that the principles of the invention are equally applicable to any kind of interacting systems and that such interaction can occur at any frequencies. With this in mind, reference is now made to FIG. 1 which shows a traveling-wave, velocity-mismatched modulator 10 in accordance with the present invention. The modulator comprises a pair of essentially identical dielectric waveguides 11 and 12 embedded in an electrooptic substrate 13 of lower refractive index, and a pair of finger electrodes 14 and 15. The waveguides are in coupling relationship over an interval L, where the coupling coefficient per unit length, $\kappa$, and the coupling interval are related by $$\kappa L = \pi/2 \qquad (2)$$

Within that interval, the electrodes are superimposed over the waveguides such that fingers 14-1, 14-2 . . . 14-n of electrode 14 are aligned directly opposite fingers 15-1, 15-2 . . . 15-n of electrode 15. Advantageously, the finger ends of the electrodes are symmetrically positioned above the adjacent edges of the underlying waveguides such that the space between the electrodes is approximately equal to, or slightly less than the space between the guides. In the embodiment of FIG. 1, the widths of the fingers, and the spaces between them are uniform over the entire length of the electrodes.

The electrodes, which form an electrical transmission line having a characteristic impedance $Z_o$, are terminated at their output end by a resistor 16 of impedance $Z_o$. The line is energized at its input end by means of a modulating signal source 17.

A pair of uniform electrodes 18 and 19, disposed adjacent to electrodes 14 and 15, respectively, are advantageously included for tuning purposes, as will be explained in greater detail hereinbelow.

In order to understand the operation of the present invention, let us first consider the operation of a coupler with uniform electrodes. In the absence of a modulating electrical signal applied to the electrodes, the propagation constants $\beta_1$ and $\beta_2$ of the two waveguides 11 and 12 are equal. As a result, an optical signal $P_1$, applied to one end of guide 11, is completely coupled to waveguide 12. Thus, in a lossless coupler, output $P_2 = P_1$ and $P_3 = 0$. If, however, an electrical signal is applied to the electrodes, the propagation constants $\beta_1$ and $\beta_2$ are locally perturbed due to the electrooptic effect. The magnitude of the resulting difference in the phase constant, $\Delta\beta$, varies as a function of time and of position along the coupler. If, however, the electrical and optical signals propagate in synchronism, photons entering the optical see a $\Delta\beta$ which remains constant over the entire coupling interval. In this special case, modulation of the optical signal can be readily controlled. If, on the other hand, the propagation constants of the optical wavepaths and the electrical wavepath are not the same, as postulated in the instant case, due to the difference in refractive indices seen by the two signals, photons entering the coupler see a constantly varying $\Delta\beta$ as they propagate along. As a consequence, the resulting modulation produced by the electrical signal is, in general, unpredictable. To avoid this problem, in accordance with the present invention, the coupling between the optical wavepaths is perturbed periodically, rather than uniformly. In particular, the spatial period $\Lambda$ of this perturbation is given by $$\frac{1}{\Lambda} = \left| \frac{\lambda_e}{n_e} - \frac{\lambda_o}{n_o} \right|. \qquad (3)$$

where
$\lambda_e$ and $\lambda_o$ are the wavelengths, respectively, of the electrical and optical signals;
and $n_e$ and $n_o$ are the effective refractive indices at said wavelengths.

Figure 2:
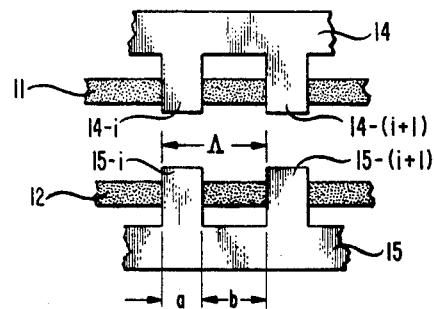
FIG. 2 shows a portion of the electrode structure of FIG. 1.

FIG. 2 shows a portion of the electrode structure including the $i^{th}$ and $i+1^{st}$ fingers. As shown, the spatial periodicity $\Lambda$ is as given by equation (3). This interval is made up of a finger of width a and a finger-to-finger spacing b where, in the most general case, $a \neq b$.

With a modulating signal applied, coupling between guides 11 and 12 is reduced over the interval a where the electric field produces a difference in the propagation constants $\beta_1$ and $\beta_2$. Between the fingers, in the interval b, the effect of the applied electric field is negligible such that $\beta_1 = \beta_2$, and the coupling is unimpaired. Thus, the net result is to reduce the total amount of optical energy coupled between the optical waveguides such that $P_2 \neq P_1$ and $P_3 \neq 0$. Furthermore, because of the periodic coupling, this division of input power between $P_2$ and $P_3$ is controlled by the modulating signal in a predictable manner notwithstanding the fact that the electrical and optical signals do not propagate in synchronism.

In a typical example using LiNO$_3$ material, $n_e = 7$ at $\lambda_e = 0.9$ cm and $n_o = 2.2$ at $\lambda_o = 0.6 \times 10^{-4}$ cm, we obtain from equation (3) a spatial period, $\Lambda$, of 0.27 $\mu$m. It will be noted that the electrode spacing is determined primarily by the optical parameters (inasmuch as $n_o/\lambda_o > > n_e/\lambda_e$) and, hence, an effective velocity match is relatively insensitive to changes in the electrical modulating signal frequency. Conversely, the modulator of FIG. 1 operates efficiently for only a relatively narrow range of optical wavelengths for a given electrode period. Neglecting the term $n_e/\lambda_e$, the phase mismatch $\Delta\beta$ between the optical and electrical waves can be expressed in terms of the optical bandwidth $\Delta\lambda$ by $$\Delta\beta = \frac{n_o}{(\lambda_o + \Delta\lambda/2)} - \frac{1}{\Lambda}, \qquad (4)$$

which reduces to $$\Delta\beta = -\frac{n_o \Delta\lambda}{2\lambda_o^2}. \qquad (5)$$

For a coupler length L, and a total mismatch $\Delta\beta L = \pi$, we obtain $$\Delta\lambda = 2.85 \lambda_o^2 / L. \qquad (6)$$

Figure 3:
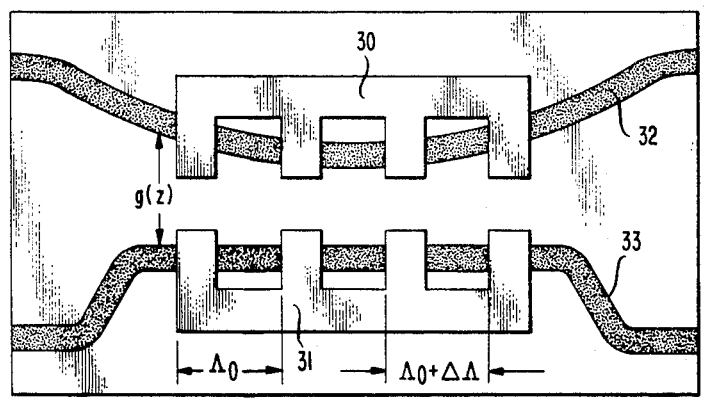
FIG. 3 shows a second embodiment of the invention in which the spatial period of the electrode finger spacing is varied over the coupling interval.

Thus, if L = 1 mm, a modulator bandwidth $\Delta\lambda$ of 10 Å is obtained. For L = 1 cm, $\Delta\lambda_o = 1$ Å. While relatively narrowband, optical pulses of the order of 5–10 picoseconds can nevertheless be generated by such a modulator. If, however, a broader optical bandwidth is required, the so-called "chirping" technique can be advantageously employed. In accordance with this technique, the spatial period, $\Lambda$, of the electrodes changes over the coupling interval, as illustrated in FIG. 3. For example, the spatial wavelength $\Lambda$ can be varied linearly over the length of the electrodes 30 and 31 from a first value $\Lambda_o$ at one end of the electrodes, to a second value $\Lambda_o + \Delta\Lambda$ at the other end. The resulting phase mismatch between a modulating signal at wavelength $\lambda_e$ and an optical signal at wavelength $\lambda_o$ is then $$2\pi \left| \frac{n_e}{\lambda_e} - \frac{n_o}{\lambda_o} \right| - 2\frac{\pi}{\Lambda} = \Delta\beta, \quad (7)$$

where $$\lambda_e = (\lambda_e)_o(1 + \Delta_e) \quad (8)$$

$$\lambda_o = (\lambda_o)_o(1 + \Delta_o) \quad (9)$$

in which $(\lambda_e)_o$ and $(\lambda_o)_o$ are the signal wavelengths for a matched condition when the spatial period is $\Lambda$; and $\Delta_e$ and $\Delta_o$ are the fractional changes on the signal wavelengths given by $$\Delta_e = \frac{\Delta\lambda_e}{(\lambda_e)_o} \text{ and } \Delta_o = \frac{\Delta\lambda_o}{(\lambda_o)_o}.$$

Noting that $\Delta_e << \lambda_e$, $\Delta_o << \lambda_o$ and $\Delta\Lambda << \Lambda_e$, equation (7) reduces to $$-\frac{n_e \Delta_e}{\lambda_e} + \frac{n_o \Delta_o}{\lambda_o} + \frac{\Delta\Lambda}{\Lambda_o^2} = \frac{\Delta\beta}{2\pi}, \quad (10)$$

Case 1

If $\Delta_o = 0$, the fractional change in spacing, $\Delta\Lambda/\Lambda_o$, required for a modulating signal bandwidth of $\Delta\lambda_e$ is given by $$\frac{\Delta\Lambda}{\Lambda_o} = \Lambda_o \cdot \frac{n_e}{(\lambda_e)_o} \cdot \frac{\Delta\lambda_e}{(\lambda_e)_o}. \quad (11)$$

For $\Delta\lambda_e = 10$ GHz, $(\lambda_o)_o = 0.5$ cm, $n_e = 6$ and $\Lambda_o$ 0.3 $\mu$m, we obtain $$\frac{\Delta\Lambda}{\Lambda_o} = 7.2 \times 10^{-4}.$$

As noted above, the modulating signal parameters have relatively little effect upon the match state, as given by equation (3). Accordingly, it is not surprising that one can obtain a very broad signal bandwidth of 10 GHz with a very modest chirp of only $7.2 \times 10^{-4}$.

Case II

If $\Delta_e$32 0, the chirp required for an optical signal bandwidth of $\Delta\lambda_o$ is given by $$\frac{\Delta\Lambda}{\Lambda_o} = \Lambda_o \cdot \frac{n_o}{(\lambda_o)_o} \cdot \frac{\Delta\lambda_o}{(\lambda_o)_o}. \quad (12)$$

For a $\Delta\lambda_o$ of 10 A, which corresponds to a pulse width of one picosecond, a chirp of about $3.8 \times 10^{-3}$ is required. This, too, is a relatively modest chirp. Thus, while the bandwidth limitations in the optical signal are real, they are not unduly severe and can be readily eased by tapering the spatial period of the interaction intervals between the two traveling wave systems.

FIG. 3 also illustrates the use of tapered coupling between the optical wavepaths by varying the spacing g(z) between the optical waveguides 32 and 33. This is advantageously done to reduce spurious side lobes when the device is used to generate pulses.

To facilitate tuning of the modulator, uniform electrodes 18 and 19 are located adjacent to one of the finger electrodes 14 and 15, as illustrated in FIG. 1. By the application of a small voltage between electrodes 14 and 18, and between electrodes 15 and 19, the optical wavelength for optimum coupling can be tuned over a range given by $$\Delta\lambda_o = \frac{\Delta n_o}{n_o} \lambda_o. \quad (13)$$

For an electrode spacing of one micron, and a $\Delta n_o \approx 2 \cdot 10^{-3}$ for LiNbO$_3$, a fine tuning of about 0.5 Å per volt can be realized.

In the embodiment of FIG. 1, the coupling coefficient, $\kappa$, for the coupled wavepaths 11 and 12 is uniform over the entire coupling interval. In addition, it was noted that the coupling between the wavepaths in the regions between adjacent fingers is essentially unaffected by the modulating signal. Thus, with the application of a modulating signal, alternating regions of match and mismatch are produced over the coupling interval. It might appear, therefore, that under these conditions it would not be possible to reduce the coupling efficiency to zero (i.e., make $P_2 = 0$). This, however, is not the case. It can readily be shown that it is the average value of the mismatch that is important. In particular, so long as the average mismatch, $\Delta\beta_{av}$, over the length of the coupler is equal to the mismatch, $\Delta\beta$, required to produce zero coupling in a coupler with uniform electrodes, the coupling efficiency can be made zero. Thus, for example, if the finger width is one half the spatial period, the magnitude of the mismatch in the region of the fingers, $\Delta\beta_f$, should be twice the mismatch for the case of uniform electrodes.

More generally, for zero coupling efficiency, the mismatch per finger of width a should be $$\Delta\beta_f = \frac{\Lambda}{a} \cdot \Delta\beta. \quad (14)$$

I claim:

1. A modulator (10) comprising:
a pair of substantially identical optical waveguides (11, 12) embedded in a substrate (13) of electrooptic material of lower refractive index;
said optical waveguides being in coupling relationship over a distance L;
and modulating means (14, 15), supportive of a traveling wave, for locally changing the propagation constants ($\beta_1$, $\beta_2$) of at least one of said waveguide (11, 12) at longitudinally spaced intervals (14-1, 15-1; 14-2, 15-2; . . . 14-n; 15-n) therealong.

2. The modulator according to claim 1 wherein the spatial period, $\Lambda$, of said intervals is uniform over said distance L.

3. The modulator according to claim 2 wherein said period, $\Lambda$, is given by $$\frac{1}{\Lambda} = \left| \frac{n_e}{\lambda_e} - \frac{n_o}{\lambda_o} \right|,$$

where $n_o$, $n_e$ are the effective refractive indices at an optical signal wavelength
$\lambda_o$, and at a modulating signal wavelength $\lambda_e$, respectively.

4. The modulator according to claim 1 wherein said period $\Lambda$ varies over said distance L between a first value $\Lambda_o$ at one end of said modulator to a second value $\Lambda_o + \Delta\Lambda$ at the other end of said modulator.

5. The modulator according to claim 1 wherein said modulating means comprises a pair of electrodes (14, 15), at least one of which is provided with a plurality of fingers (14-1, 14-2 . . . 14-n) which extend over one of said waveguides (11) towards the other of said electrodes.

6. The modulator according to claim 1 wherein said modulating means comprises a pair of electrodes (14, 15) for producing periodic regions of electric field within said waveguides (11, 12).

7. The modulator according to claim 6 wherein said electrodes (14, 15) have fingers (14-1, 14-2 . . . 14-n; 15-1, 15-2 . . . 15-n) whose ends are symmetrically positioned above said waveguides (11, 12) and directly opposite each other.

8. The modulator according to claim 6 including a third electrode (18) disposed adjacent to one (14) of said pair of electrodes, and a fourth electrode (19) disposed adjacent to the other (15), of said electrodes for tuning said modulator.

9. The modulator according to claim 1 wherein the coefficient of coupling, $\kappa$, between said waveguides is given by
$\kappa L = \pi/2$.

* * * * *